(12) United States Patent
Nguyen

(10) Patent No.: US 8,132,039 B1
(45) Date of Patent: Mar. 6, 2012

(54) TECHNIQUES FOR GENERATING CLOCK SIGNALS USING COUNTERS

(75) Inventor: Andy Nguyen, San Jose, CA (US)

(73) Assignee: Altera Corporation, San Jose, CA (US)

( * ) Notice: Subject to any disclaimer, the term of this patent is extended or adjusted under 35 U.S.C. 154(b) by 767 days.

(21) Appl. No.: 11/931,235

(22) Filed: Oct. 31, 2007

(51) Int. Cl.
*G06F 1/04* (2006.01)

(52) U.S. Cl. ........ 713/501; 713/500; 713/600; 327/156; 377/39

(58) Field of Classification Search ................ 713/500, 713/501, 600; 327/156; 377/39
See application file for complete search history.

(56) References Cited

U.S. PATENT DOCUMENTS

| | | | |
|---|---|---|---|
| 6,008,744 A * | 12/1999 | Kamishima | 341/58 |
| 6,225,840 B1 * | 5/2001 | Ishimi | 327/116 |
| 6,788,120 B1 | 9/2004 | Nguyen | |
| 6,806,782 B2 * | 10/2004 | Motoyoshi et al. | 331/44 |
| 6,903,587 B2 * | 6/2005 | Sasaki et al. | 327/165 |
| 6,906,562 B1 | 6/2005 | Nguyen | |
| 6,906,571 B1 | 6/2005 | Nguyen | |
| 6,914,460 B1 | 7/2005 | Nguyen | |
| 6,924,684 B1 | 8/2005 | Nguyen | |
| 7,005,900 B1 | 2/2006 | Nguyen | |
| 7,139,361 B1 | 11/2006 | Nguyen | |
| 7,157,953 B1 | 1/2007 | Nguyen | |
| 7,212,049 B2 * | 5/2007 | Oka | 327/151 |
| 7,236,557 B1 | 6/2007 | Nguyen | |
| 7,248,124 B2 * | 7/2007 | McCorquodale et al. | 331/44 |

* cited by examiner

*Primary Examiner* — Thuan Du
(74) *Attorney, Agent, or Firm* — Steven J. Cahill

(57) ABSTRACT

The circuit, typically a delay-locked loop, comprises a phase detector, a first counter, a second counter, and a comparator. The phase detector compares a phase of a first clock signal with a phase of a second clock signal. The first counter generates first count signals and adjusts the first count signals when the phase detector indicates that the phases of the first and the second clock signals are out of alignment. The second counter generates second count signals. The first comparator generates a first comparison signal in response to a comparison between the first count signals and the second count signals. The second clock signal is generated in response to the first comparison signal.

24 Claims, 9 Drawing Sheets

US 8,132,039 B1

TECHNIQUES FOR GENERATING CLOCK SIGNALS USING COUNTERS

BACKGROUND OF THE INVENTION

The present invention relates to electronic circuits, and more particularly, to loop circuits.

A phase-locked loop (PLL) is an electronic circuit that generates one or more periodic (clock) output signals. A PLL adjusts the frequency of a feedback signal from the output of an oscillator to match in phase the frequency of an input reference clock signal. Phase-locked loops (PLLs) are an essential building block of many integrated circuits, providing periodic signals for data recovery, data transfer, and other clocking functions.

A delay-locked loop (DLL) is another electronic circuit that generates one or more output clock signals. A DLL adjusts the phase of a feedback signal to match the phase of an input reference clock signal. Clock signals generated by PLLs and DLLs are often distributed through an integrated circuit or electronic system.

BRIEF SUMMARY OF THE INVENTION

According to some embodiments of the present invention, a circuit comprises a phase detector, a first counter, a second counter, and a comparator. The phase detector compares a phase of a first clock signal with a phase of a second clock signal. The first counter generates first count signals and adjusts the first count signals when the phase detector indicates that the phases of the first and the second clock signals are out of alignment. The second counter generates second count signals. The first comparator generates a first comparison signal in response to a comparison between the first count signals and the second count signals. The second clock signal is generated in response to the first comparison signal.

Various objects, features, and advantages of the present invention will become apparent upon consideration of the following detailed description and the accompanying drawings.

DETAILED DESCRIPTION OF THE INVENTION

According to some embodiments of the present invention, a delay-locked loop (DLL) circuit can generate an output clock signal having a phase shift relative to an input reference clock signal. The phase of the output clock signal can, for example, be shifted by 90 degrees relative to the phase of the input reference clock signal. A clock signal having a 90-degree phase shift is useful for double data rate applications. The DLL can have mostly digital circuit elements including, for example, a digital counter circuit and a digital oscillator circuit.

Figure 1:
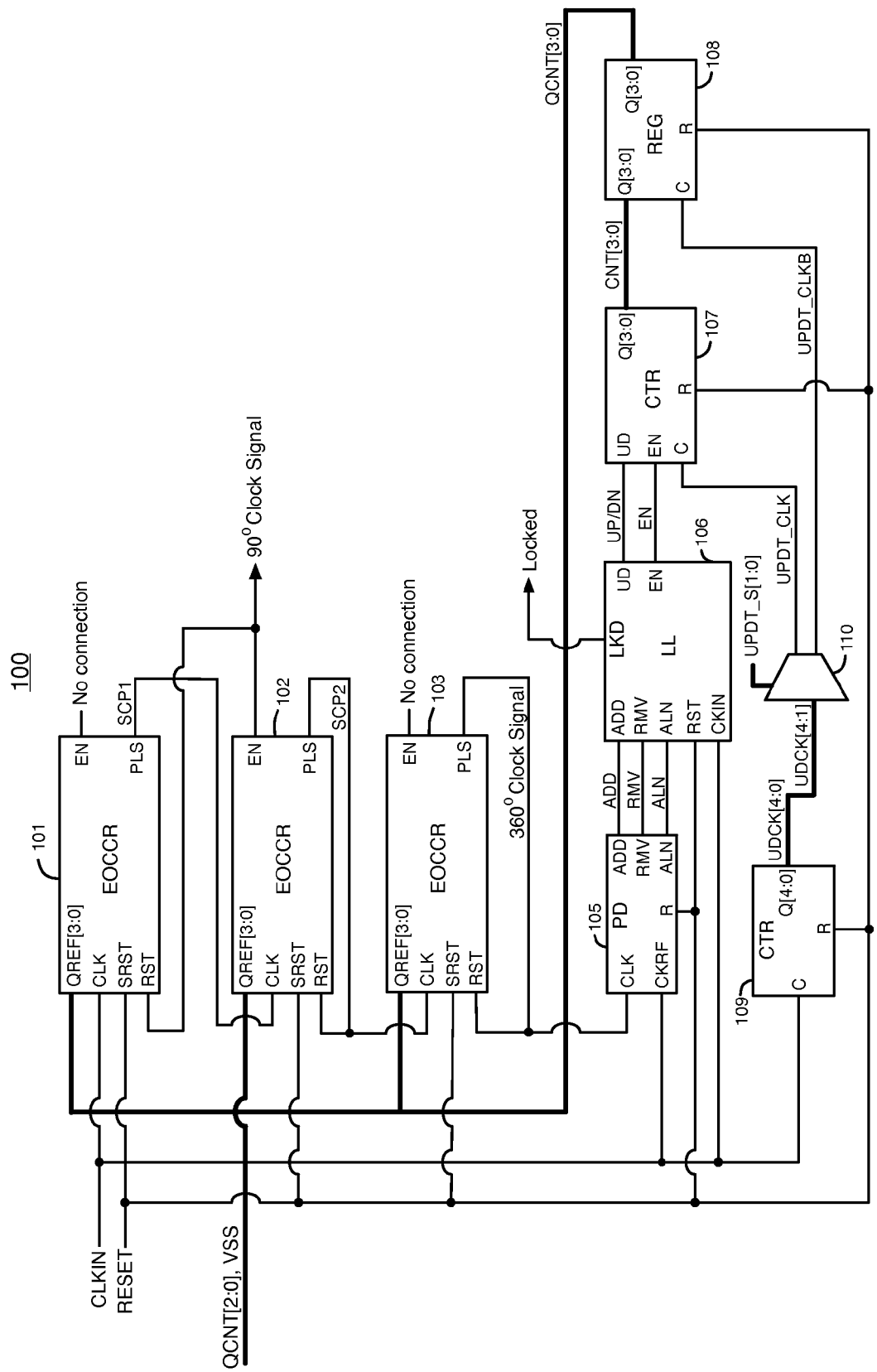
FIG. 1 is a diagram that illustrates an example of a delay-locked loop (DLL) circuit, according to an embodiment of the present invention.

FIG. 1 is a diagram that illustrates an example of a delay-locked loop (DLL) circuit 100, according to an embodiment of the present invention. DLL 100 in FIG. 1 includes enable oscillator counter comparator registers (EOCCRs) 101-103, phase detector 105, locked logic 106, up/down counter 107, register 108, 5-bit counter 109, and multiplexer 110. DLL 100 receives an input reference clock signal CLKIN and a reset signal RESET as input signals. DLL 100 generates a periodic output 90° Clock signal having a phase that is offset by 90 degrees from the phase of the input reference clock signal CLKIN when the phases of the CLKIN and 360° Clock signals are aligned.

EOCCR 101 receives input reference clock signal CLKIN at its CLK input terminal and reset signal RESET at its SRST (system reset) input terminal. The 4 QREF[3:0] input terminals of EOCCR 101 are coupled to receive the 4 digital output count signals QCNT[3:0] of register 108 through a bus. The reset RST input terminal of EOCCR 101 is coupled to receive the 90° Clock signal generated at the enable EN output terminal of EOCCR 102. The enable EN output terminal of EOCCR 101 is not connected to anything. EOCCR 101 generates a signal SCP1 at its pulse output terminal PLS.

EOCCR 102 receives signal SCP1 generated by EOCCR 101 at its CLK input terminal and reset signal RESET at its SRST (system reset) input terminal. EOCCR 102 receives the 3 least significant bits QCNT[2:0] (i.e., bits 2, 1, and 0) of the 4 output count signals QCNT[3:0] of register 108 and voltage VSS (e.g., ground) at its 4 QREF[3:0] input terminals through a bus. EOCCR 102 receives VSS as the least significant bit, QCNT bit 0 as the second least significant bit, QCNT bit 1 as the second most significant bit, and QCNT bit 2 as the most significant bit [2, 1, 0, VSS]. Thus, the bits of the QCNT[2:0] signals are shifted to the left by one bit, the least significant bit is 0, and QCNT bit 3 is dropped, which has the effect of a multiply-by-2 function on the binary value of the QCNT[3:0] signals. EOCCR 102 generates the 90° Clock signal at its enable EN output terminal. EOCCR 102 generates a signal SCP2 at its pulse output terminal PLS. The reset RST input terminal of EOCCR 102 is coupled to receive the SCP2 signal.

EOCCR 103 receives signal SCP2 generated by EOCCR 102 at its CLK input terminal and reset signal RESET at its SRST (system reset) input terminal. The 4 output count signals QCNT[3:0] of register 108 are transmitted to the 4 QREF [3:0] input terminals of EOCCR 103 through a bus. The enable EN output terminal of EOCCR 103 is not connected to anything. EOCCR 103 generates a 360° Clock signal at its pulse output terminal PLS. The reset RST input terminal of EOCCR 103 is coupled to receive the 360° Clock signal generated at the PLS output terminal of EOCCR 103. The 360° Clock signal has the same or approximately the same phase as the input reference clock signal CLKIN when the ALN signal generated by phase detector 105 is a logic high.

Phase detector (PD) circuit 105 is a phase comparator circuit. Phase detector 105 receives the 360° Clock signal at its CLK input terminal. Phase detector 105 receives the input reference clock signal CLKIN at its CKRF input terminal. Phase detector 105 also receives the RESET signal at its R input. Phase detector 105 generates an ADD output signal at its ADD output terminal, a RMV output signal at its RMV output terminal, and a ALN output signal at its ALN output terminal.

Locked logic (LL) circuit 106 receives the ADD signal from PD 105 at its ADD input terminal, the RMV signal from PD 105 at its RMV input terminal, and the ALN signal from PD 105 at its ALN input terminal. Locked logic 106 receives the input reference clock signal CLKIN at its CKIN input terminal and the RESET signal at its RST input terminal. Locked logic 106 generates a Locked signal at its LKD output terminal, an UP/DN signal at its UD output terminal, and an EN enable signal at its EN output terminal.

Counter 107 is a 4-bit up/down counter circuit. Counter 107 receives the UP/DN signal from LL 106 at its UD input terminal and the EN signal from LL 106 at its EN input terminal. Counter 107 also receives the UPDT_CLK clock signal from multiplexer 110 at its C input terminal and the RESET signal at its R input terminal. Counter 107 generates 4 digital count signals CNT[3:0] at its Q[3:0] output terminals.

Register 108 is a storage circuit, such as a set of D flip-flops. Register 108 receives the 4 digital count signals CNT[3:0] from counter 107 at its Q[3:0] input terminals. Register 108 also receives an UPDT_CLKB clock signal from multiplexer 110 at its C input terminal. Register 108 generates the digital count signals QCNT[3:0] at its Q[3:0] output terminals. Register 108 also receives the RESET signal at its R input terminal.

Counter 109 is a 5-bit counter circuit. Counter 109 receives the input reference clock signal CLKIN at its C input terminal and the RESET signal at its R input terminal. Counter 109 generates 5 digital clock signals UDCK[4:0] at its Q[4:0] output terminals. Counter 109 increases the binary value of the clock signals UDCK[4:0] at its Q[4:0] output terminals by one after each rising edge of the input reference clock signal CLKIN.

Multiplexer 110 receives four UDCK[4:1] of the five digital clock signals UDCK[4:0] at four of its input terminals. The five digital clock signals UDCK[4:0] are also referred to as UDCK bits. Multiplexer 110 receives UDCK bits 4, 3, 2, and 1 out of UDCK bits 4, 3, 2, 1, and 0, where bit 0 is the least significant bit, and bit 4 is the most significant bit. Multiplexer 110 also receives two select signals UPDT_S[1:0] at two select input terminals. Multiplexer 110 selects one of the 4 digital clock signals UDCK[4:1] as the first output clock signal UPDT_CLK of multiplexer 110. The second output clock signal UPDT_CLKB of multiplexer 110 is the digital inverse of the UPDT_CLK output signal.

Multiplexer 110 is programmed by the UPDT_S[1:0] signals to control the period of the UPDT_CLK clock signal relative to the period of the CLKIN signal. For example, when the binary value of UPDT_S[1:0] is 00, multiplexer 110 transmits the fourth most significant UDCK bit (i.e., bit 1) generated by counter 109 to its output terminal as the UPDT_CLK signal, causing the period of the UPDT_CLK clock signal to be 4 times as long as the period of the CLKIN signal. Thus, DLL 100 causes the frequency of the UPDT_CLK clock signal to be one-fourth (¼) the frequency of CLKIN.

As another example, when the binary value of UPDT_S[1:0] is 01, multiplexer 110 transmits the third most significant UDCK bit (i.e., bit 2) generated by counter 109 to its output terminal as the UPDT_CLK signal, causing the period of the UPDT_CLK clock signal to be 8 times as long as the period of the CLKIN signal. Thus, DLL 100 causes the frequency of the UPDT_CLK clock signal to be one-eighth (⅛) the frequency of CLKIN. Multiplexer 110 selects the second most significant UDCK bit (i.e., bit 3) when the binary value of UPDT_S[1:0] is 10, causing the frequency of the UPDT_CLK clock signal to be ¹⁄₁₆ the frequency of CLKIN. Multiplexer 110 selects the most significant UDCK bit (i.e., bit 4) when the binary value of UPDT_S[1:0] is 11, causing the frequency of the UPDT_CLK clock signal to be ¹⁄₃₂ the frequency of CLKIN.

Figure 2:
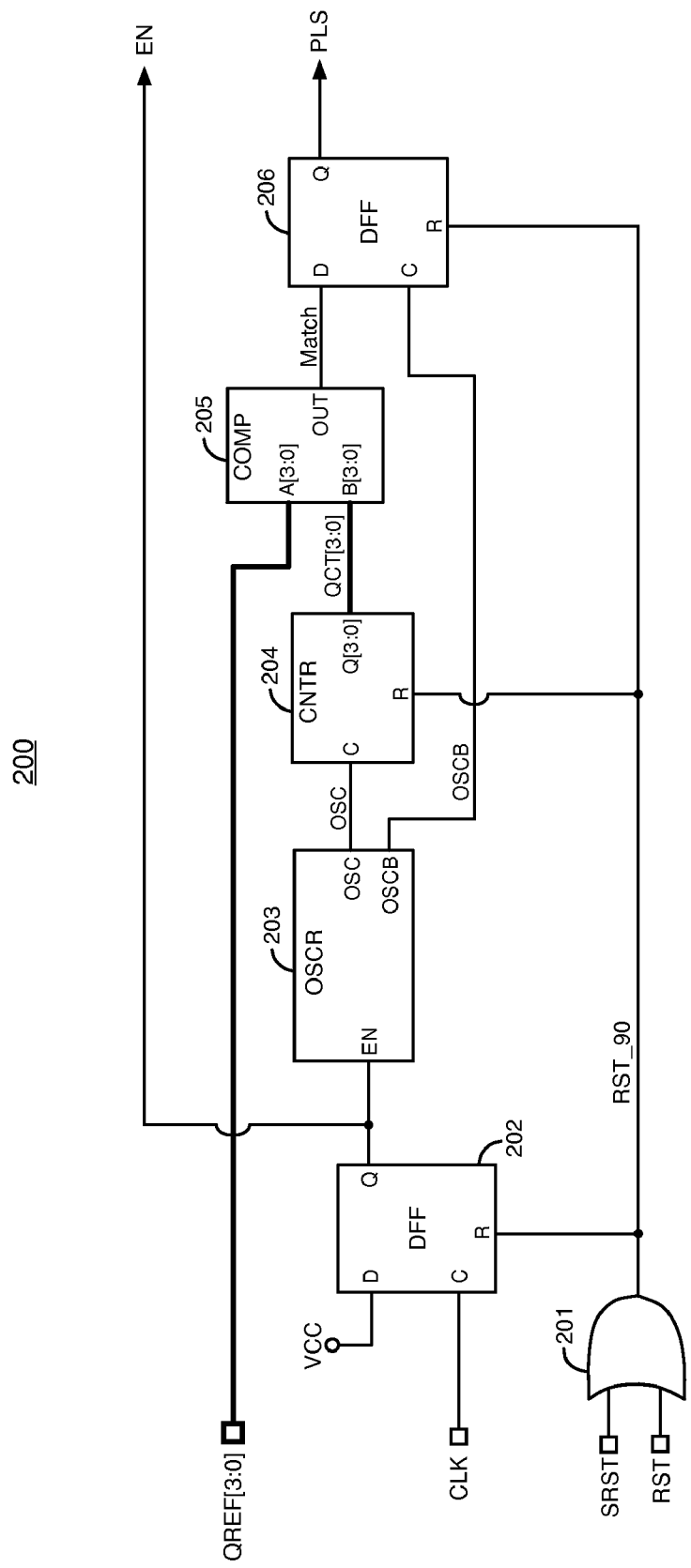
FIG. 2 is a diagram that illustrates an example of an enable oscillator counter comparator register (EOCCR), according to an embodiment of the present invention.

FIG. 2 is a diagram that illustrates an example of an EOCCR 200, according to an embodiment of the present invention. EOCCR 200 shown in FIG. 2 is an example of each of the EOCCRs 101-103 in DLL 100. EOCCR 200 includes OR gate 201, D flip-flop 202, oscillator circuit 203, counter circuit 204, comparator circuit 205, and D flip-flop 206.

The input terminals of OR gate 201 are coupled to the RST and SRST inputs of EOCCR 200. The RST_90 output signal of OR gate 201 is transmitted to the R input terminals of circuits 202, 204, and 206. The D input terminal of flip-flop 202 is coupled to receive a power supply voltage VCC, and the C input terminal of flip-flop 202 is coupled to the CLK input terminal of EOCCR 200. The Q output terminal of flip-flop 202 is coupled to the EN input terminal of oscillator 203 and the EN output terminal of EOCCR 200. Oscillator 203 generates one clock signal OSC at its OSC output terminal and another clock signal OSCB at its OSCB output terminal. Clock signal OSCB is the inverse of clock signal OSC.

Counter 204 is a 4-bit counter circuit that receives the OSC signal at its C input terminal. Counter 204 generates 4 digital count signals QCT[3:0] at its Q[3:0] output terminals. The four A[3:0] input terminals of comparator 205 are coupled to the four input terminals QREF[3:0] of EOCCR 200. The four B[3:0] input terminals of comparator 205 are coupled to receive count signals QCT[3:0] from the output terminals Q[3:0] of counter 204. Comparator 205 generates an output signal Match at its output terminal OUT. Comparator 205 can, for example, include four comparator circuits that are implemented by CMOS logic gates. The D input terminal of flip-flop 206 is coupled to receive the Match output signal of comparator 205. The C input terminal of flip-flop 206 is coupled to receive the OSCB signal from oscillator 203. The Q output terminal of flip-flop 206 is coupled to the PLS output terminal of EOCCR 200.

Figure 3:
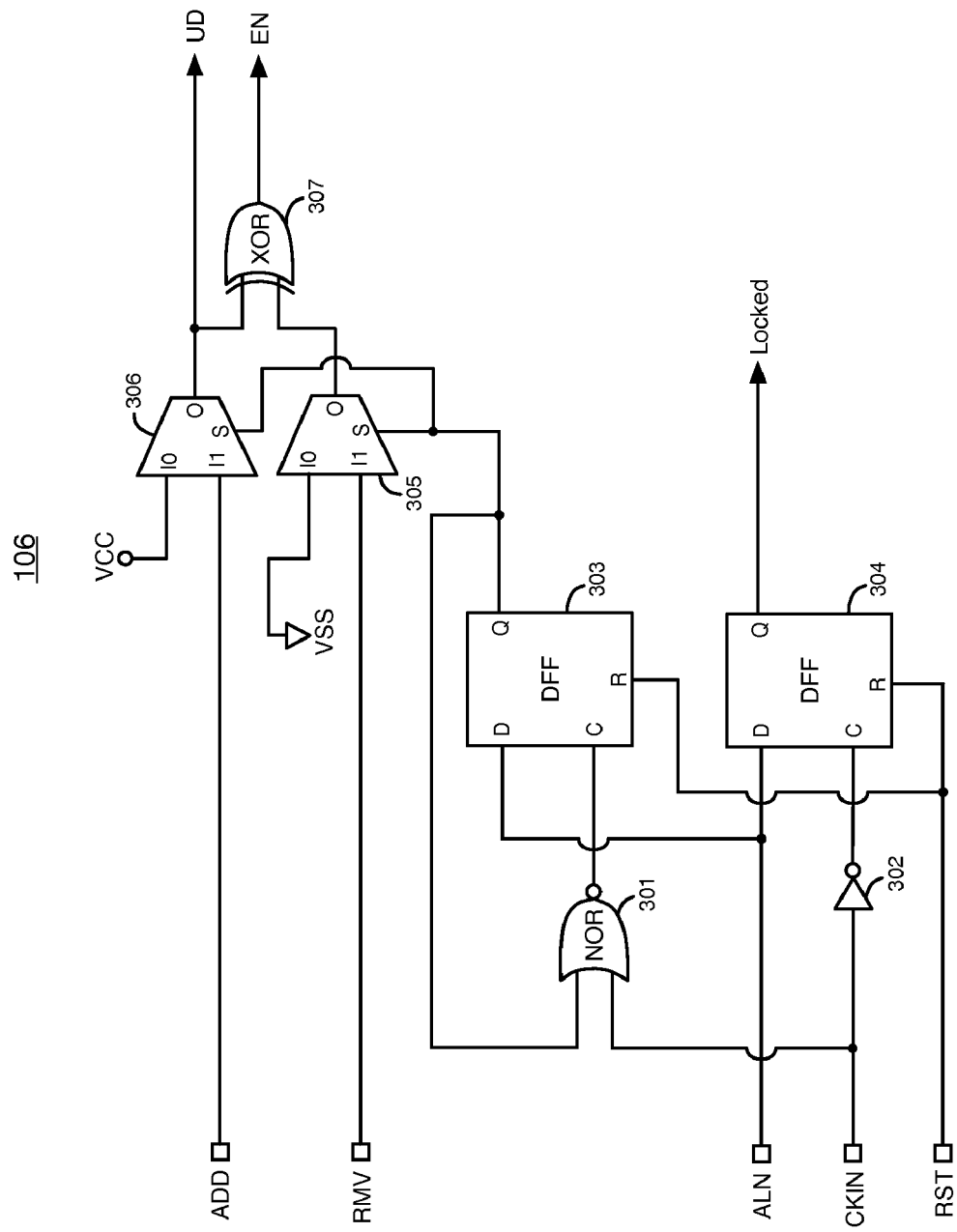
FIG. 3 shows a detailed diagram of a locked logic circuit, according to an embodiment of the present invention.

FIG. 3 shows a detailed diagram of locked logic circuit 106, according to an embodiment of the present invention. Locked logic circuit 106 includes NOR gate 301, inverter 302, D flip-flops 303-304, multiplexers 305-306, and XOR gate 307. The first input terminal of NOR gate 301 is coupled to the Q output terminal of flip-flop 303, and the second input terminal of NOR gate 301 is coupled to the CKIN input terminal of locked logic 106. The D input terminal of flip-flop 303 is coupled to the ALN input terminal of locked logic 106. The C input terminal of flip-flop 303 is coupled to the output terminal of NOR gate 301. The R input terminal of flip-flop 303 is coupled to the RST input terminal of locked logic 106.

The input terminal of inverter 302 is coupled to the CKIN input terminal of locked logic 106. The output terminal of inverter 302 is coupled to the C input terminal of flip-flop 304. The D input terminal of flip-flop 304 is coupled to the ALN input terminal of locked logic 106. The R input terminal of flip-flop 304 is coupled to the RST input terminal of locked logic 106. Flip-flop 304 generates the Locked signal at its Q output terminal and at the LKD output terminal of locked logic 106.

The first input terminal I0 of multiplexer 305 is coupled to voltage VSS (e.g., ground), and the second input terminal I1 of multiplexer 305 is coupled to input terminal RMV of locked logic 106. The select input terminal S of multiplexer 305 is coupled to the Q output terminal of flip-flop 303.

The first input terminal I0 of multiplexer 306 is coupled to power supply voltage VCC, and the second input terminal I1 of multiplexer 306 is coupled to input terminal ADD of locked logic 106. The select input terminal S of multiplexer 306 is coupled to the Q output terminal of flip-flop 303. The output terminal O of multiplexer 306 is coupled to the UD output terminal of locked logic 106.

The first input terminal of XOR gate 307 is coupled to the output terminal O of multiplexer 305, and the second input terminal of XOR gate 307 is coupled to the output terminal O of multiplexer 306. The output terminal of XOR gate 307 is coupled to the EN output terminal of locked logic 106.

An example of the operation of DLL 100 is now described in detail with reference to FIGS. 4A-4F. In this example, the binary value of the UPDT_S[1:0] signals is 00, and the UPDT_CLK and UPDT_CLKB clock signals have one-fourth the frequency of the input clock signal CLKIN. DLL 100 generates an output 90° Clock signal that is phase shifted by 90° relative to the phase of CLKIN when the Locked signal is a logic high.

DLL 100 begins operating after a system reset. During a system reset, the RESET signal changes from a logic low to a logic high, which resets EOCCRs 101-103. After a rising edge of the RESET signal, OR gate 201 generates a logic high at the R input terminals of registers 202 and 206, resetting the signals at the Q output terminals of registers 202 and 206 to logic low states. OR gate 201 also generates a rising edge at the R input terminal of counter 204, which resets all of the QCT[3:0] count signals of counter 204 to logic low states. Thus, the SCP1, SCP2, 90° Clock and 360° Clock signals generated by EOCCRs 101-103 are reset to logic low states during a system reset.

The RESET signal also resets circuits 105-109. During the system reset, the signals at the ADD, RMV, and ALN output terminals of phase detector 105 are reset to logic low states, the signals at the UD and EN output terminals of locked logic 106 are reset to logic high states, and all of the clock signals UDCK[4:0] at the Q[4:0] output terminals of counter 109 are reset to logic low states. The RESET signal causes counter 107 to reset its output count signals CNT[3:0] to a binary value of 0001. During a system reset, the output signals QCNT[3:0] of register 108 are reset to a binary value of 0001. The system reset ends when the RESET signal changes to a logic low state. The binary value of signals QCNT[2:0] and VSS at the QREF[3:0] input terminals of EOCCR 102 is 0010 after the system reset.

A first count of DLL 100 begins after a system reset when a logic high state occurs in the input reference clock signal CLKIN. When the CLKIN signal at the CLK input of EOCCR 101 is a logic high after a system reset, flip-flop 202 inside EOCCR 101 stores supply voltage VCC at its Q output terminal, which is received as a logic high at the EN input terminal of oscillator 203 and at the EN output terminal of EOCCR 101. A logic high at the enable EN input terminal of oscillator 203 causes oscillator 203 to begin generating pulses (i.e., rising and falling edges) in its OSC and OSCB output signals.

The frequency of the oscillator signals OSC and OSCB (e.g., 10-20 GHz) generated by oscillator 203 in each of the EOCCRs is greater than the frequency of input reference clock signal CLKIN (e.g., 10 MHz-1 GHz). DLL 100 generates an increasingly accurate 90-degree phase shift in the 90° Clock signal as the frequency of the OSC oscillator signals generated by the oscillators in the EOCCRs increases.

The logic states of the QCNT[3:0] signals at the QREF[3:0] input terminals of EOCCR 101 are represented by a binary value of 0001. The Match output signal of comparator 205 is initially a logic low, because the logic states of the QCT[3:0] count signals do not match the logic states of the QCNT[3:0] signals. In response to each rising edge of the OSC output signal of oscillator 203, counter 204 increases the binary value of its output count signals QCT[3:0] by one. After counter 204 increases the binary value of its output count signals QCT[3:0] to 0001, comparator 205 generates a logic high state in the Match signal. After the next rising edge in the OSCB signal at the C input terminal of flip-flop 206, flip-flop 206 stores the logic high state of the Match signal at its Q output terminal, causing a logic high state in the SCP1 signal at the PLS output terminal of EOCCR 101.

EOCCR 102 receives the SCP1 signal at its CLK input terminal. After a logic high occurs in the SCP1 signal, EOCCR 102 generates a rising edge in the 90° Clock signal at its EN output terminal. EOCCR 101 receives the 90° Clock signal at its RST input terminal. OR gate 201 resets circuits 202, 204, and 206 in EOCCR 101 in response to each rising edge in the 90° Clock signal, causing all of the QCT[3:0] output signals of counter 204 and the Q output signals of flip-flops 202 and 206 to become logic lows. Thus, a logic low occurs in the SCP1 signal after the logic high in SCP1.

The logic states of the input signals at the QREF[3:0] input terminals of EOCCR 102 are 0010. When a logic high occurs in the SCP1 signal, flip-flop 202 in EOCCR 102 enables oscillator 203. After oscillator 203 is enabled, counter 204 increases the binary value of its output count signals QCT[3:0] by one in response to each rising edge in the OSC signal generated by oscillator 203. When the binary value of count signals QCT[3:0] is 0010, the Match output signal of comparator 205 becomes a logic high. Flip-flop 206 generates a logic high in the SCP2 output signal at the PLS output terminal of EOCCR 102 in response to the next rising edge in the OSCB signal generated by oscillator 203. EOCCR 102 receives the SCP2 signal at its RST input terminal. Each logic high in the SCP2 signal resets circuit EOCCR 102, causing a subsequent logic low in the SCP2 signal.

EOCCR 103 receives the SCP2 signal at its CLK input terminal. When a logic high occurs in the SCP2 signal, flip-flop 202 in EOCCR 103 enables oscillator 203. After oscillator 203 is enabled, counter 204 increases the binary value of its output count signals QCT[3:0] by one in response to each rising edge in the OSC signal. When the binary value of count signals QCT[3:0] is 0001, the Match output signal of comparator 205 becomes a logic high. Flip-flop 206 generates a logic high in the 360° Clock signal at the PLS output terminal of EOCCR 103 in response to the next rising edge in the OSCB signal. EOCCR 103 receives the 360° Clock signal at its RST input terminal. Each logic high in the 360° Clock signal resets circuit EOCCR 103, causing a subsequent logic low in the 360° Clock signal.

Figure 4A:
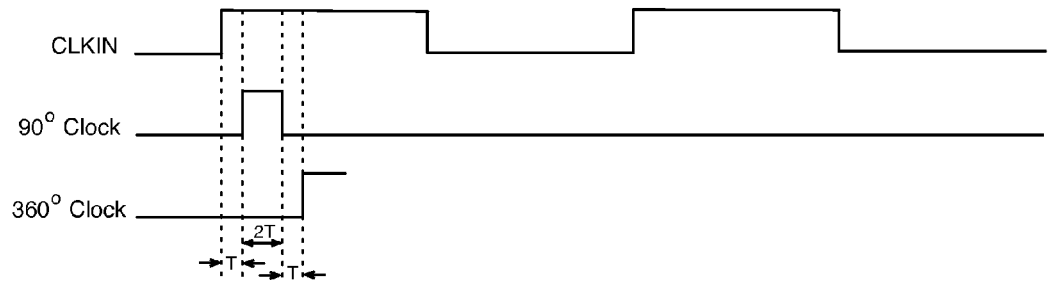
FIG. 4A illustrates the logic states of the CLKIN, 90° Clock, and 360° Clock signals during the first count of the DLL of FIG. 1, according to an embodiment of the present invention.

FIG. 4A illustrates the logic states of the CLKIN, 90° Clock, and 360° Clock signals during the first count of DLL 100 in response to the first rising edge of CLKIN. The rising edge of the 360° Clock signal occurs later in time than the first rising edge of the CLKIN signal as shown in FIG. 4A. In FIG. 4A, T refers to the time delay between the rising edge of CLKIN and the subsequent rising edge of the 90° Clock signal. The duration of the high pulse on the 90° Clock signal equals 2T, and the time delay between the falling edge of the 90° Clock signal and the next rising edge of the 360° Clock signal equals T.

Phase detector 105 receives the input reference clock signal CLKIN signal at its CKRF input terminal and the 360° Clock signal at its CLK input terminal. Phase detector 105 compares the phase of the CLKIN signal to the phase of the 360° Clock signal. Because the phase of the 360° Clock signal and the phase of the CLKIN signal are not aligned, phase detector 105 maintains its ALN output signal in a logic low state.

Referring to locked logic 106 in FIG. 3, the output signal of D flip-flop 303 at its Q output terminal is reset to a logic low after a rising edge at its R input terminal during a system reset when the RESET signal is a logic high. Phase detector 105 keeps the ALN signal low, except when the phases of CLKIN and the 360° Clock signal are aligned (e.g., within a small percentage of the period of CLKIN). The output signal of NOR gate 301 is a logic high when the CLKIN signal and the signal at the Q output terminal of flip-flop 303 are both low. Flip-flop 303 latches the logic state of the ALN signal to its Q output terminal when the output signal of NOR gate 301 at its C input terminal is a logic high. The output signal of flip-flop 303 remains in a logic low state when the ALN signal at the ALN input terminal is a logic low.

The output terminal of flip-flop 303 is coupled to the S select input terminals of multiplexers 305 and 306. Multiplexer 306 transmits voltage VCC, which is in a logic high state, to its output terminal O in response to a logic low at its select S input terminal. Because the output terminal O of multiplexer 306 is coupled to the UD output terminal of locked logic 106, the UP/DN signal at the UD output terminal of locked logic 106 is a logic high.

Multiplexer 305 transmits voltage VSS, which is in a logic low state, to its output terminal O in response to a logic low at its select S input terminal. The output signal of XOR gate 307 is a logic high, because the input terminals of XOR gate 307 are coupled to the output terminals of multiplexers 305 and 306, and the output signals of multiplexers 305-306 are in different logic states. The output terminal of XOR gate 307 is coupled to the EN output terminal of locked logic 106. Thus, the EN output signal at the EN output terminal of locked logic 106 is a logic high.

When the UP/DN signal is a logic low, and the EN signal is a logic high, counter 107 decreases the binary value of count signals CNT[3:0] by one on each rising edge of the UPDT_CLK clock signal. When the UP/DN signal is a logic high, and the EN signal is a logic high, counter 107 increases the binary value of count signals CNT[3:0] by one on each rising edge of the UPDT_CLK clock signal. Alternatively, counter 107 can change the binary value of count signals CNT[3:0] after each falling edge of the UPDT_CLK signal, or after each rising and each falling edge of the UPDT_CLK signal. Counter 107 maintains the binary value of count signals CNT[3:0] constant when the EN input signal is a logic low. Register 108 stores the logic states of count signals CNT[3:0] at its Q[3:0] output terminals as the QCNT[3:0] count signals on each rising edge of clock signal UPDT_CLKB.

Figure 4B:
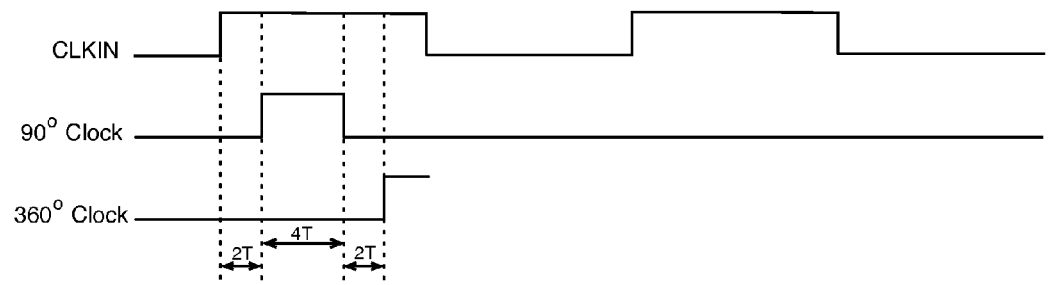
FIG. 4B illustrates the logic states of the CLKIN, 90° Clock, and 360° Clock signals during the second count of the DLL of FIG. 1, according to an embodiment of the present invention.
Figure 4C:
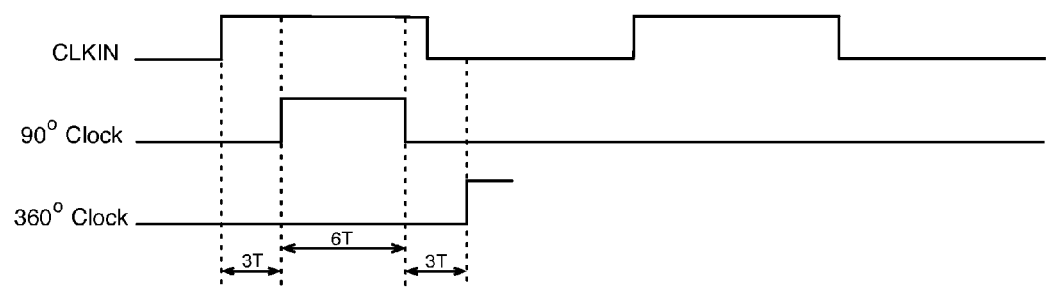
FIG. 4C illustrates the logic states of the CLKIN, 90° Clock, and 360° Clock signals during the third count of the DLL of FIG. 1, according to an embodiment of the present invention.
Figure 4D:
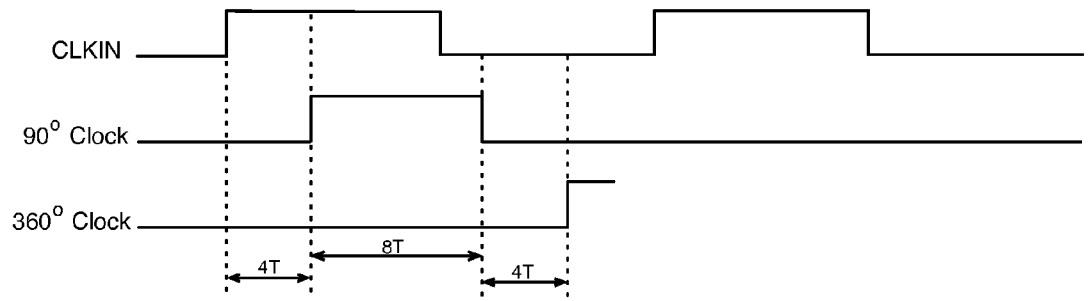
FIG. 4D illustrates the logic states of the CLKIN, 90° Clock, and 360° Clock signals during the fourth count of the DLL of FIG. 1, according to an embodiment of the present invention.
Figure 4E:
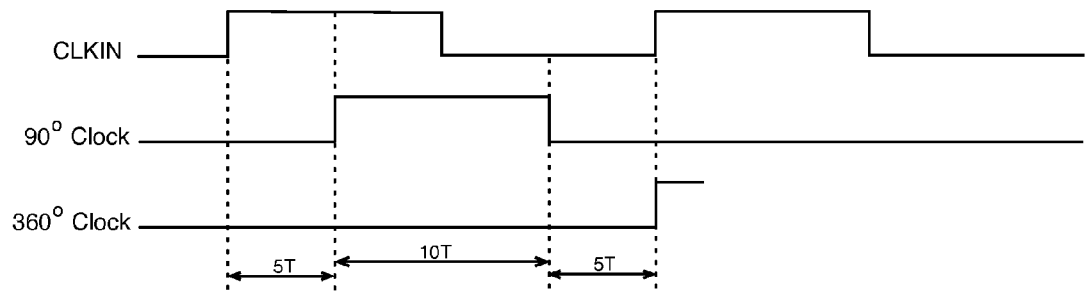
FIG. 4E illustrates the logic states of the CLKIN, 90° Clock, and 360° Clock signals during the fifth count of the DLL of FIG. 1, according to an embodiment of the present invention.
Figure 4F:
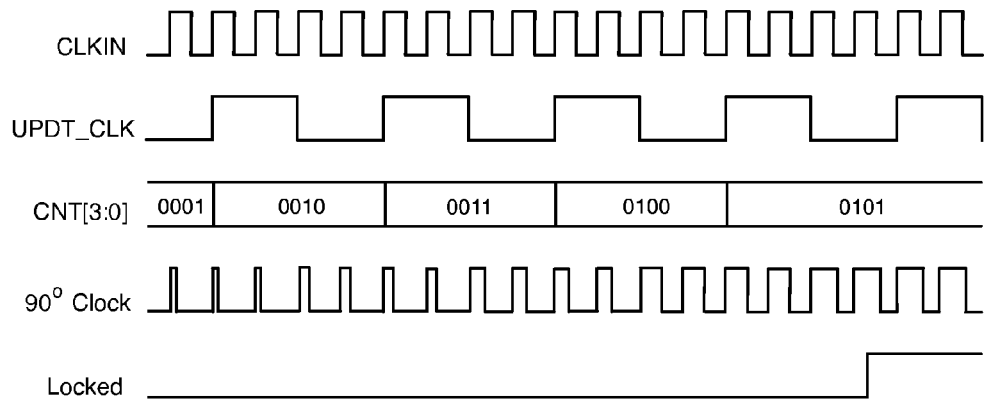
FIG. 4F illustrates example waveforms for the CLKIN, UPDT_CLK, 90° Clock, CNT[3:0], and Locked signals over 5 counts of the DLL of FIG. 1, according to an embodiment of the present invention.

FIG. 4F illustrates example waveforms for the CLKIN, UPDT_CLK, 90° Clock, CNT[3:0], and Locked signals over 5 counts of the CNT[3:0] signals. The binary value of the CNT[3:0] signals change on each rising edge of the UPDT_CLK signal, until the Locked signal generated by phase detector 105 becomes a logic high.

On the first rising edge of the UPDT_CLK clock signal, counter 107 increases the binary value of the CNT[3:0] count signals by one to 0010, as shown in FIG. 4F, which begins a second count of DLL 100. On the next rising edge of the UPDT_CLKB signal, register 108 changes the logic states of the QCNT[3:0] count signals to 0010.

When the logic states of the QCNT[3:0] count signals are 0010, a logic high in the CLKIN signal at the CLK input of EOCCR 101 causes the output signal of flip-flop 202 at its Q output terminal to change from a logic low to a logic high, which enables oscillator 203. Then, counter 204 in EOCCR 101 begins to increase the binary value of its count signals QCT[3:0]. When the binary value of the QCT[3:0] count signals generated by counter 204 increases to 0010, comparator 205 generates a logic high in the Match signal. Flip-flop 206 then generates a rising edge (and thus a logic high) in the SCP1 signal at the PLS output terminal of EOCCR 101 on the next rising edge of the OSCB signal.

The logic high in the SCP1 signal causes EOCCR 102 to generate a logic high in the 90° Clock signal at its EN output terminal. The logic high in the 90° Clock signal causes a subsequent falling edge in the SCP1 signal. The binary value of the signals at the QREF[3:0] input terminals of EOCCR 102 is 0100 during the second count. The logic high in SCP1 also causes EOCCR 102 to generate a logic high in the SCP2 output signal at its PLS output terminal, after counter 204 in EOCCR 102 increases the binary value of its count signals QCT[3:0] to 0100. The logic high in the SCP2 signal causes subsequent falling edges in the SCP2 signal and the 90° Clock signal generated by EOCCR 102.

The logic high in the SCP2 signal causes EOCCR 103 to generate a logic high in the 360° Clock signal at its PLS output terminal, after counter 204 in EOCCR 103 increases the binary value of its count signals QCT[3:0] to 0010. The logic high in the 360° Clock signal causes a subsequent falling edge in the 360° Clock signal.

FIG. 4B illustrates the logic states of the CLKIN, 90° Clock, and 360° Clock signals during the second count of DLL 100 in response to logic states of 0010 in the CNT[3:0] signals. The phase of the 360° Clock signal occurs later in time during the second count, as shown in FIG. 4B, because extra time is required for counters 204 in EOCCRs 101 and 103 to count up to 0010 and for counter 204 in EOCCR 102 to count up to 0100. 2T is the time delay between the rising edge of CLKIN and the subsequent rising edge of the 90° Clock signal. Thus, this time delay increases by a factor of two in the second count relative to the first count. The duration of the high pulse on the 90° Clock signal equals 4T. The time delay between the falling edge of the 90° Clock signal and the next rising edge of the 360° Clock signal equals 2T.

Phase detector 105 maintains the ALN signal in a logic low state. Locked logic 106 maintains its UP/DN and EN output signals in logic high states, because the Q output signal of flip-flop 303 remains low. Counter 107 increases the binary value of its output count signals CNT[3:0] by one to 0011 on the next rising edge of clock signal UPDT_CLK, as shown in FIG. 4F, which begins the third count of DLL 100. On the next rising edge of clock signal UPDT_CLKB, register 108 changes the logic states of its output signals QCNT[3:0] to 0011.

Each logic high in the CLKIN signal causes counter 204 in EOCCR 101 to increase the binary value of its count signals QCT[3:0]. When the binary value of the QCNT[3:0] signals is 0011, EOCCR 101 generates a logic high pulse in the SCP1 signal, after counter 204 in EOCCR 101 increases the binary value of its count signals QCT[3:0] to 0011.

The logic high pulse in the SCP1 signal causes EOCCR 102 to generate a logic high pulse in the 90° Clock signal. The binary value of the signals at the QREF[3:0] input terminals of EOCCR 102 is 0110 during the third count. The logic high pulse in the SCP1 signal causes EOCCR 102 to generate a logic high pulse in the SCP2 output signal, after counter 204 in EOCCR 102 increases the binary value of its QCT[3:0] signals to 0110. The logic high pulse in the SCP2 signal causes EOCCR 103 to generate a logic high pulse in the 360° Clock signal, after counter 204 in EOCCR 103 increases the binary value of its QCT[3:0] signals to 0011.

FIG. 4C illustrates the logic states of the CLKIN, 90° Clock, and 360° Clock signals during the third count of DLL 100 in response to logic states of 0011 in the CNT[3:0] signals. The phase of the 360° Clock signal occurs later in time, as shown in FIG. 4C, because extra time is required for counters 204 in EOCCRs 101 and 103 to count up to 0011 and for counter 204 in EOCCR 102 to count up to 0110. 3T is the time delay between the rising edge of CLKIN and the subsequent rising edge of the 90° Clock signal. Thus, the time delay between the rising edge of CLKIN and the subsequent rising edge of the 90° Clock signal triples in the third count relative to the first count of DLL 100. The duration of the high pulse on the 90° Clock signal equals 6T, and the time delay between the falling edge of the 90° Clock signal and the next rising edge of the 360° Clock signal equals 3T.

Phase detector 105 maintains the ALN signal in a logic low state. Locked logic 106 maintains its UP/DN and EN output signals in logic high states, because the Q output signal of flip-flop 303 remains low. Counter 107 increases the binary value of its output count signals CNT[3:0] to 0100 on the next rising edge of clock signal UPDT_CLK, as shown in FIG. 4F, which begins the fourth count of DLL 100. On the next rising edge of clock signal UPDT_CLKB, register 108 changes the logic states of its output signals QCNT[3:0] to 0100.

A logic high occurs in the CLKIN signal after the binary value of the QCNT[3:0] signals becomes 0100, causing counter 204 in EOCCR 101 to begin increasing the binary value of its output count signals QCT[3:0]. When the binary value of the QCNT[3:0] signals is 0100, EOCCR 101 generates a logic high pulse in the SCP1 signal, after counter 204 in EOCCR 101 increases the binary value of its QCT[3:0] signals to 0100.

The logic high pulse in the SCP1 signal causes EOCCR 102 to generate a logic high pulse in the 90° Clock signal. The binary value of the signals at the QREF[3:0] input terminals of EOCCR 102 is 1000 during the fourth count. The logic high pulse in the SCP1 signal causes EOCCR 102 to generate a logic high pulse in the SCP2 output signal, after counter 204 in EOCCR 102 increases the binary value of its QCT[3:0] signals to 1000. The logic high pulse in the SCP2 signal causes EOCCR 103 to generate a logic high pulse in the 360° Clock signal, after counter 204 in EOCCR 103 increases the binary value of its QCT[3:0] signals to 0100.

FIG. 4D illustrates the logic states of the CLKIN, 90° Clock, and 360° Clock signals during the fourth count of DLL 100 in response to logic states of 0100 in the CNT[3:0] signals. The phase of the 360° Clock signal occurs later in time, as shown in FIG. 4D, because extra time is required for counters 204 in EOCCRs 101 and 103 to count up to 0100 and for counter 204 in EOCCR 102 to count up to 1000. 4T is the time delay between the rising edge of CLKIN and the subsequent rising edge of the 90° Clock signal. In the fourth count, the time delay between the rising edge of CLKIN and the subsequent rising edge of the 90° Clock signal increases by four times relative to first count of DLL 100. The duration of the high pulse in the 90° Clock signal equals 8T, and the time delay between the falling edge of the 90° Clock signal and the next rising edge of the 360° Clock signal equals 4T.

Phase detector 105 maintains the ALN signal in a logic low state. Locked logic 106 maintains its UP/DN and EN signals in logic high states, because the Q output signal of flip-flop 303 remains low. Counter 107 increases the binary value of its output count signals CNT[3:0] by one to 0101 on the next rising edge of clock signal UPDT_CLK, as shown in FIG. 4F, which begins the fifth count of DLL 100. On the next rising edge of clock signal UPDT_CLKB, register 108 changes the logic states of its output signals QCNT[3:0] to 0101.

A logic high occurs in the CLKIN signal after the binary value of the QCNT[3:0] signals becomes 0101, causing counter 204 in EOCCR 101 to begin increasing the binary value of its output count signals QCT[3:0]. When the binary value of the QCNT[3:0] signals is 0101, EOCCR 101 generates a logic high pulse in the SCP1 signal, after counter 204 in EOCCR 101 increases the binary value of its count signals QCT[3:0] to 0101.

The logic high pulse in the SCP1 signal causes EOCCR 102 to generate a logic high pulse in the 90° Clock signal. The binary value of the signals at the QREF[3:0] input terminals of EOCCR 102 is 1010 during the fifth count. The logic high pulse in the SCP1 signal causes EOCCR 102 to generate a logic high pulse in the SCP2 output signal, after counter 204 in EOCCR 102 increases the binary value of its QCT[3:0] signals to 1010. The logic high pulse in the SCP2 signal causes EOCCR 103 to generate a logic high pulse in the 360° Clock signal, after counter 204 in EOCCR 103 increases the binary value of its QCT[3:0] signals to 0101.

FIG. 4E illustrates the logic states of the CLKIN, 90° Clock, and 360° Clock signals during the fifth count of DLL 100 in response to logic states of 0101 in the QCNT[3:0] signals. The phase of the 360° Clock signal occurs later in time, as shown in FIG. 4E, because extra time is required for counters 204 in EOCCRs 101 and 103 to count up to 0101 and for counter 204 in EOCCR 102 to count up to 1010. 5T is the time delay between the rising edge of CLKIN and the subsequent rising edge of the 90° Clock signal. Thus, the time delay between the rising edge of CLKIN and the subsequent rising edge of the 90° Clock signal in the fifth count increases by five times relative to the first count of DLL 100. The duration of the high pulse on the 90° Clock signal equals 10T. The time delay between the falling edge of the 90° Clock signal and the next rising edge of the 360° Clock signal equals 5T.

As shown in the example of FIG. 4E, the rising edges of the CLKIN and 360° Clock signals are aligned during the fifth count of DLL 100. Because the phases of CLKIN and the 360° Clock signals are aligned, phase detector 105 generates a rising edge in the ALN signal during the fifth count of DLL 100. After the next falling edge in the CLKIN signal, inverter 302 in FIG. 3 generates a logic high at the C input of flip-flop 304. When the ALN signal is a logic high, and the CLKIN signal is a logic low, flip-flop 304 stores the high logic state of the ALN signal at its Q output terminal, and locked logic 106 generates a logic high state in the Locked signal at its LKD output terminal.

When the CLKIN signal at the CKIN input terminal of locked logic 106 is a logic low, and the ALN signal at the ALN input of locked logic 106 is a logic high, flip-flop 303 stores a logic high state at its Q output terminal. The output signal of NOR gate 301 remains in a logic low state as long as flip-flop 303 continues to store a logic high state at its Q output terminal. Therefore, falling edges in CLKIN do not cause rising edges at the C input of flip-flop 303. Flip-flop 303 maintains the signal at its Q output terminal in a logic high state, even after the ALN signal changes to a logic low state, until a rising edge is received at the R input terminal of flip-flop 303 during a system reset.

The logic high at the Q output terminal of flip-flop 303 is transmitted to the S input terminals of multiplexers 305 and 306. Multiplexer 305 transmits the RMV signal from its I1 input terminal to its O output terminal in response to a logic high at its S input terminal. Multiplexer 306 transmits the ADD signal from its I1 input terminal to its O output terminal in response to a logic high at its S input terminal.

Phase detector 105 causes the ADD and the RMV signals to be in logic low states, because the phases of the CLKIN and 360° Clock signals are aligned. The UP/DN output signal at the UD output terminal of locked logic 106 is a logic low. XOR gate 307 causes the EN output signal of locked logic 106 to be a logic low, because the input signals of XOR gate 307 are in the same logic state. When the EN output signal of locked logic 106 is a logic low, counter 107 maintains the logic states of its 4 output count signals CNT[3:0] constant. When signals CNT[3:0] are constant, register 108 maintains the logic states of its 4 output signals QCNT[3:0] constant. Thus, the binary value of signals CNT[3:0] and QCNT[3:0] remains at 0101, while the phases of CLKIN and the 360° Clock signal are aligned.

If the phase of clock signal CLKIN moves out of alignment with the phase of the 360° Clock signal, DLL 100 increases or decreases the binary value of the CNT[3:0] and QCNT[3:0] signals to adjust the phase of the 360° Clock signal until it matches the phase of CLKIN again. For example, if the phase of the CLKIN signal begins to lag behind the phase of the 360° Clock signal after the locked state shown in FIG. 4E (i.e., the rising edges of CLKIN occur later in time than the corresponding rising edges of the 360° Clock signal), phase detector 105 generates a logic high in the ADD signal at its ADD output terminal. Phase detector 105 causes the RMV signal and the ALN signal to be in logic low states. Multiplexer 306 generates a logic high in the UP/DN signal at the UD output terminal of locked logic 106 in response to a logic high in the ADD signal. Multiplexer 305 generates a logic low at its O output terminal in response to the RMV signal. XOR gate 307 generates a logic high in the EN signal at the EN output terminal of locked logic 106, because the two input signals of XOR gate 307 are in different logic states.

When the UP/DN and EN output signals of locked logic 106 are high again, counter 107 increases the binary value of its output count signals CNT[3:0] to 0110 on the next rising edge of clock signal UPDT_CLK, which begins another count of DLL 100. On the next rising edge of clock signal UPDT_CLKB, register 108 changes the logic states of its output signals QCNT[3:0] to 0110. During this count of DLL 100, EOCCR 102 increases the delay between a rising edge in CLKIN and the subsequent rising edge in the 90° Clock signal to 6T. The high pulse in the 90° Clock signal becomes 12T long. EOCCR 103 causes the delay between the falling edge in the 90° Clock signal and the next rising edge in the 360° Clock signal to increase to 6T. Thus, increasing the binary value of count signals CNT[3:0] causes the phases (and the rising edges) of the 90° and 360° Clock signals to occur later in time.

Phase detector 105 then compares the phase of CLKIN to the phase of the 360° Clock signal to determine if the phases are aligned (e.g., within a small percentage). If the phases are aligned, phase detector 105 generates a rising edge on the ALN signal, a falling edge on the ADD signal, and counter 107 maintains the binary value of its CNT[3:0] signals constant, as described above.

Aligning the phases of the CLKIN and the 360° Clock signals in 5 counts of the CNT[3:0] count signals after a system reset is merely one example of the operation of DLL 100. DLL 100 may take more or less than 5 counts to align the phases of the CLKIN and the 360° Clock signals, depending upon the frequency of CLKIN.

If the phase of the CLKIN signal begins to lead the phase of the 360° Clock signal after the locked state shown in FIG. 4E (i.e., the rising edges of CLKIN occur sooner than the corresponding rising edges of the 360° Clock signal), phase detector 105 generates a rising edge in the RMV signal at its RMV output terminal. Phase detector 105 causes the ADD signal and ALN signal to be in logic low states. Multiplexer 305 generates a logic high at its O output terminal in response to a logic high in the RMV signal. Multiplexer 306 generates a logic low in the UP/DN signal at the UD output terminal of locked logic 106 in response to the ADD signal. XOR gate 307 generates a logic high in the EN output signal of locked logic 106, because the two input signals of XOR gate 307 are in different logic states.

When the UP/DN signal is low, and the EN output signal of locked logic 106 is high, counter 107 decreases the binary value of its output count signals CNT[3:0] from 0101 to 0100 on the next rising edge of clock signal UPDT_CLK, which begins another count of DLL 100. On the next rising edge of clock signal UPDT_CLKB, register 108 changes the logic states of its output signals QCNT[3:0] to 0100. During this count of DLL 100, EOCCR 102 decreases the delay between a rising edge in CLKIN and the subsequent rising edge in the 90° Clock signal to 4T as shown in FIG. 4D. The high pulse in the 90° Clock signal becomes 8T long. EOCCR 103 causes the delay between the falling edge in the 90° Clock signal and the next rising edge in the 360° Clock signal to decrease to 4T, as shown in FIG. 4D. Thus, decreasing the binary value of count signals CNT[3:0] causes the phases (and the rising edges) of the 90° and 360° Clock signals to occur sooner in time.

Phase detector 105 then compares the phase of CLKIN to the phase of the 360° Clock signal to determine if the phases are aligned (e.g., within a small percentage). If the phases are aligned, phase detector 105 generates a rising edge on the ALN signal, a falling edge on the RMV signal, and counter 107 maintains the binary value of its CNT[3:0] signals constant, as described above.

Thus, DLL 100 increases and/or decreases the phases of the 90° and 360° Clock signals until the phase of the 360° Clock signal is aligned with the phase of the input reference clock signal CLKIN. Up/Down counter 107 increases the binary value of the count signals CNT[3:0] to increase the phases of the 90° and 360° Clock signals. When the phases of the 90° and 360° Clock signals increase, the rising edges in the 90° and 360° Clock signals occur later in time. Up/Down counter 107 decreases the binary value of the count signals CNT[3:0] to decrease the phases of the 90° and 360° Clock signals.

When the phases of the 90° and 360° Clock signals decrease, the rising edges in the 90° and 360° Clock signals occur sooner in time. When the phases of the 360° Clock signal and CLKIN are aligned, the phase of the 90° Clock signal is 90° behind the phase of CLKIN. In the examples of FIGS. 4A-4F, the Locked signal goes high after the binary value of the CNT[3:0] signals changes to 0101.

According to some embodiments of the present invention, a counter based DLL, such as DLL 100, generally requires less die area to fabricate on an integrated circuit than a conventional DLL having a delay chain that can generate a large number of phase shifts in the output clock signal. For example, a counter based DLL having an 8-bit up/down counter (instead of 4-bit counter 107) can generate 256 counts. The 256 counts correspond to 256 different phase shifts that can be generated in the output clock signal of the DLL. A delay chain based DLL requires at least 256 delay units to generate 256 different phase shifts in the output clock signal of the DLL. As another example, a counter based DLL having a 9-bit up/down counter can generate 512 different phase shifts in the output clock signal of the DLL. A delay chain based DLL requires at least 512 delay units to generate 512 different phase shifts in the output clock signal. As yet another example, a counter based DLL having a 10-bit up/down counter can generate 1024 different phase shifts in the output clock signal of the DLL. A delay chain based DLL requires at least 1024 delay units to generate 1024 different phase shifts in the output clock signal.

As described above, the binary value X of the count signals CNT[3:0] generated by counter 107 when the phases of the CLKIN and 360° Clock signals are aligned is stored in register 108. According to another embodiment, DLL 100 uses the binary value X of the count signals to generate another output clock signal CLK_PS that has any desired phase shift Y relative to the phase of CLKIN. The binary value B of the count signals CNT[3:0] needed to generate a phase shift Y in CLK_PS is calculated using the equation, $B=Y \times [(4 \times X)/360]$. The binary value B is stored and used to generate output clock signal CLK_PS directly from every rising edge of CLKIN by another set of EOCCRs. This other set of EOCCRs uses the binary values (2×X) to generate a 50% duty-cycle in CLK_PS. In this embodiment, the 90° Clock signal is only an internal signal. As the frequency of CLKIN, the power supply voltage, and/or the temperature of the DLL varies, the phase of clock signal CLK_PS tracks these variations, because phase detector 105 causes the phase of the 360° Clock signal to track these variations.

According to other embodiments of the present invention, DLL 100 can be implemented using programmable logic circuit blocks (i.e., soft logic) on a programmable logic integrated circuit, such as a field programmable gate array (FPGA). Programmable logic circuit blocks are sometimes referred to as programmable logic elements, or simply as logic elements. All of the circuit blocks in DLL 100 can be implemented using programmable logic circuit blocks, except phase detector 105 and oscillators 203 in each of EOCCRs 101-103. Phase detector 105 and oscillators 203 in each of the EOCCRs are implemented using hard-wired (non-programmable) circuitry. Thus, DLL 100 requires a small amount of hard-wired circuitry on an FPGA.

Figure 5:
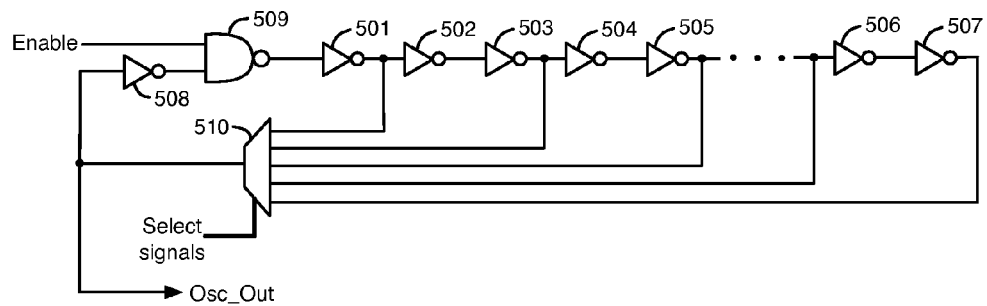
FIG. 5 illustrates an example of a variable frequency oscillator circuit, according to an embodiment of the present invention.

FIG. 5 illustrates an example of a variable frequency oscillator circuit, according to an embodiment of the present invention. The oscillator circuit shown in FIG. 5 is an example of oscillators 203 in EOCCRs 101-103. Oscillator circuit 500 in FIG. 5 includes 8 inverter circuits 501-508, NAND gate 509, and multiplexer 510. Inverters 501-507 are coupled in series. Oscillator 500 can have any number of inverters coupled in series.

The input terminals of multiplexer 510 are coupled to the output terminals of every odd-numbered inverter. In FIG. 5, the five input terminals of multiplexer 510 are coupled to the output terminals of inverters 501, 503, 505, and 507. The output terminal of multiplexer 510 is coupled to the input terminal of inverter 508. The input terminals of NAND gate 509 are coupled to the output terminal of inverter 508 and an Enable signal. The output terminal of NAND gate 509 is coupled to the input terminal of inverter 501.

Three or more Select signals are transmitted to the select input terminals of multiplexer 510. Multiplexer 510 transmits the output signal of one of inverters 501, 503, 505, or 507 to the input terminal of inverter 508 in response to the logic states of the Select signals. A ring oscillator is formed when multiplexer 510 couples one of its input terminals to its output terminal.

When the Enable signal is a logic high, the output signals of the inverters in the ring oscillator and NAND gate 509 begin to oscillate, generating a periodic digital clock signal Osc_Out at the output terminal of multiplexer 510. The logic states of the Select signals can be changed to vary the frequency of the Osc_Out signal. When the logic states of the Select signals change, multiplexer 510 transmits the output signal of a different one of the inverters 501, 503, 505, 507 to the input terminal of inverter 508, which changes the frequency of Osc_Out.

Figure 6:
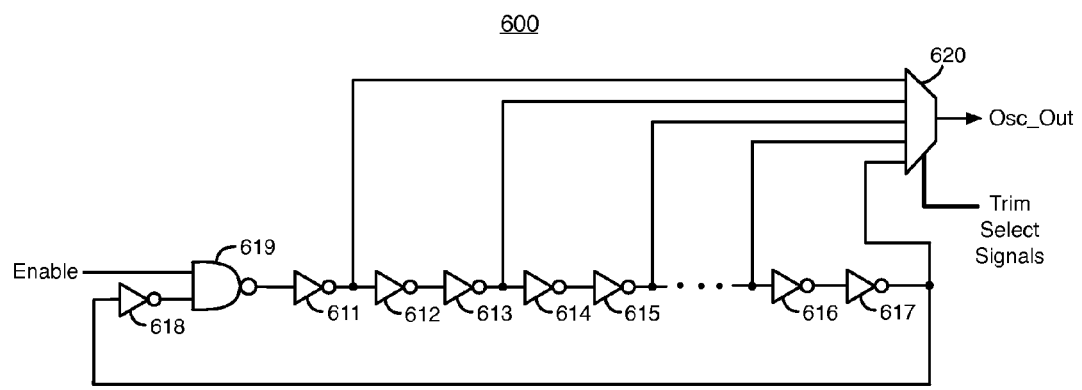
FIG. 6 illustrates an example of an oscillator circuit having an adjustable delay, according to an embodiment of the present invention.

FIG. 6 illustrates an example of an oscillator circuit having an adjustable delay, according to an embodiment of the present invention. Oscillator circuit 600 shown in FIG. 6 is an example of oscillators 203 in EOCCRs 101-103. Oscillator circuit 600 includes 8 inverter circuits 611-618, NAND gate 619, and multiplexer 620. Inverters 611-618 are coupled in series. Oscillator 600 can have any number of inverters coupled in series.

The input terminals of multiplexer 620 are coupled to the output terminals of every odd-numbered inverter. In FIG. 6, the 5 input terminals of multiplexer 620 are coupled to the output terminals of inverters 611, 613, 615, and 617. The input terminals of NAND gate 619 are coupled to the output terminal of inverter 618 and an Enable signal. The output terminal of NAND gate 619 is coupled to the input terminal of inverter 611. Inverters 611-618 and NAND gate 619 are coupled together as a ring oscillator.

Three or more Trim Select signals are transmitted to the select input terminals of multiplexer 620. Multiplexer 620 transmits the output signal of one of inverters 611, 613, 615, or 617 to the output terminal of multiplexer 620 in response to the logic states of the Trim Select signals.

When the Enable signal is a logic high, the output signals of the inverters in the ring oscillator and NAND gate 619 begin to oscillate, generating a periodic digital clock signal Osc_Out at the output terminal of multiplexer 620. The frequency of Osc_Out is fixed and does not change. The logic states of the Trim Select signals can be changed to vary the delay in the Osc_Out signal. When the logic states of the Trim Select signals change, multiplexer 620 transmits the output signal of a different one of the inverters 611, 613, 615, or 617 to its output terminal.

Figure 7A:
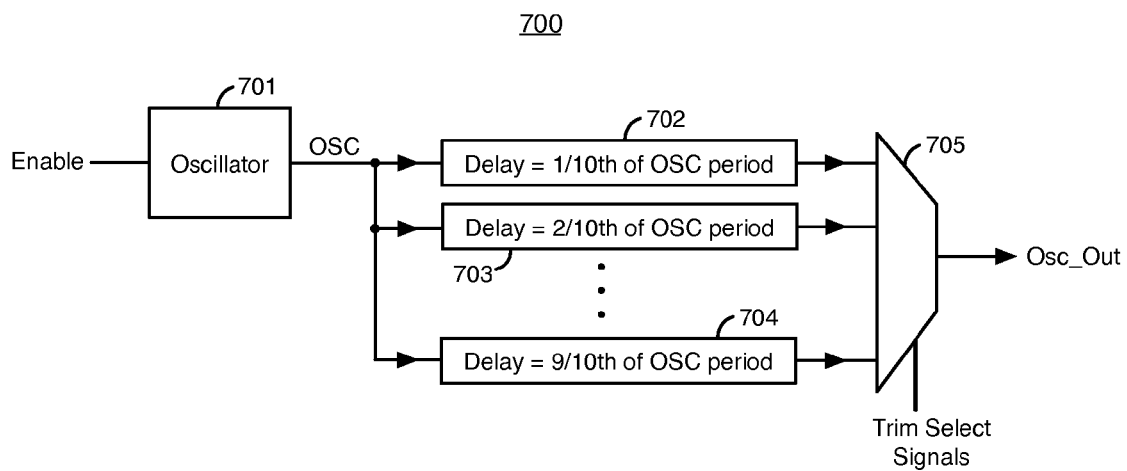
FIGS. 7A and 7B illustrate examples of circuit configurations that can adjust the delay of periodic clock signals generated by oscillators, according to additional embodiments of the present invention.
Figure 7B:
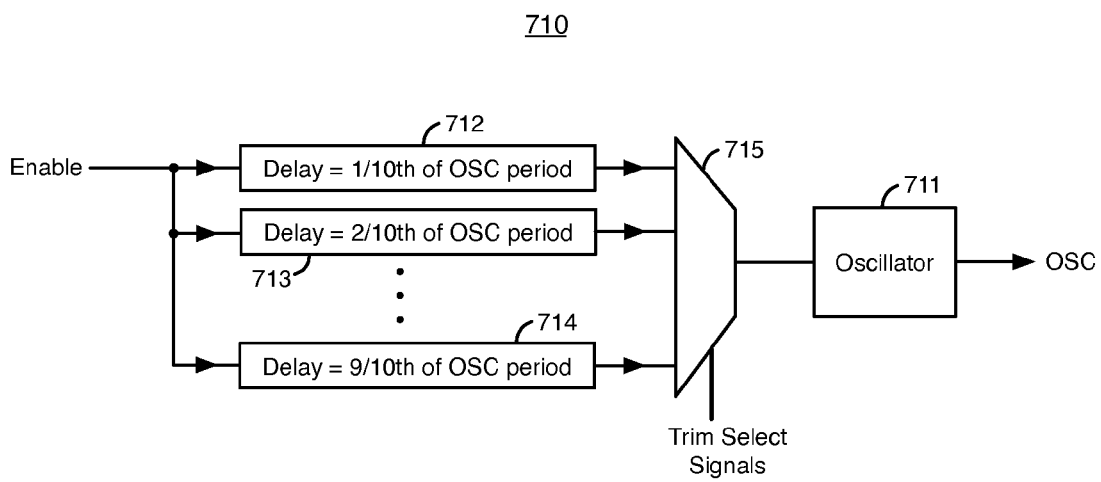

FIGS. 7A and 7B illustrate examples of circuit configurations that can adjust the delay of periodic clock signals generated by oscillators, according to additional embodiments of the present invention. The circuit configurations shown in FIGS. 7A and 7B are examples of oscillators 203 in EOCCRs 101-103.

Circuit 700 in FIG. 7A includes an oscillator circuit 701, 9 delay circuits including delay circuits 702-704, and multiplexer 705. Oscillator circuit 701 generates a periodic output signal OSC. Oscillator circuit 701 can be, for example, oscillator 500 or oscillator 600.

Each of the 9 delay circuits in circuit 700 delays the periodic output signal OSC of oscillator 701 by a multiple of $\frac{1}{10}$ of the period of signal OSC. For example, delay circuit 702 delays the OSC signal by $\frac{1}{10}$ of the period of OSC. Delay circuit 703 delays the OSC signal by $\frac{2}{10}$ of the period of OSC. Delay circuit 704 delays the OSC signal by $\frac{9}{10}$ of the period of OSC.

Multiplexer 705 receives Trim Select signals at its select input terminals. Multiplexer 705 selects the output signal of one of the delay circuits in circuit 700 to transmit to its output terminal as the Osc_Out signal. The logic states of the Trim Select signals determine which of the delay circuit output signals multiplexer 705 transmits to its output terminal as Osc_Out. The logic states of the Trim Select signals can be changed to vary the delay of the Osc_Out signal.

Circuit 710 in FIG. 7B includes oscillator circuit 711, 9 delay circuits including delay circuits 712-714, and multiplexer 715. Oscillator circuit 711 generates a periodic output signal OSC. Oscillator circuit 711 can be, for example, oscillator 500 or oscillator 600. Each of the delay circuits in circuit 710 delays an Enable signal by a multiple of $\frac{1}{10}$ of the period of the periodic output signal OSC of oscillator 711. For example, delay circuit 712 delays the Enable signal by $\frac{1}{10}$ of the period of OSC. Delay circuit 713 delays the Enable signal by $\frac{2}{10}$ of the period of OSC. Delay circuit 714 delays the Enable signal by $\frac{9}{10}$ of the period of OSC.

Multiplexer 715 receives Trim Select signals at select input terminals. Multiplexer 711 selects the output signal of one of the delay circuits in circuit 710 and transmits the selected delay circuit output signal to oscillator 711. The logic states of the Trim Select signals determine which of the delay circuit output signals multiplexer 715 transmits to oscillator 711. The delay circuit output signal selected by multiplexer 715 is transmitted to NAND gate 509 or 619 in oscillator 711 as the Enable signal shown in FIGS. 5-6. The logic states of the Trim Select signals can be changed to vary the delay of the OSC output signal of oscillator 711.

Figure 8:
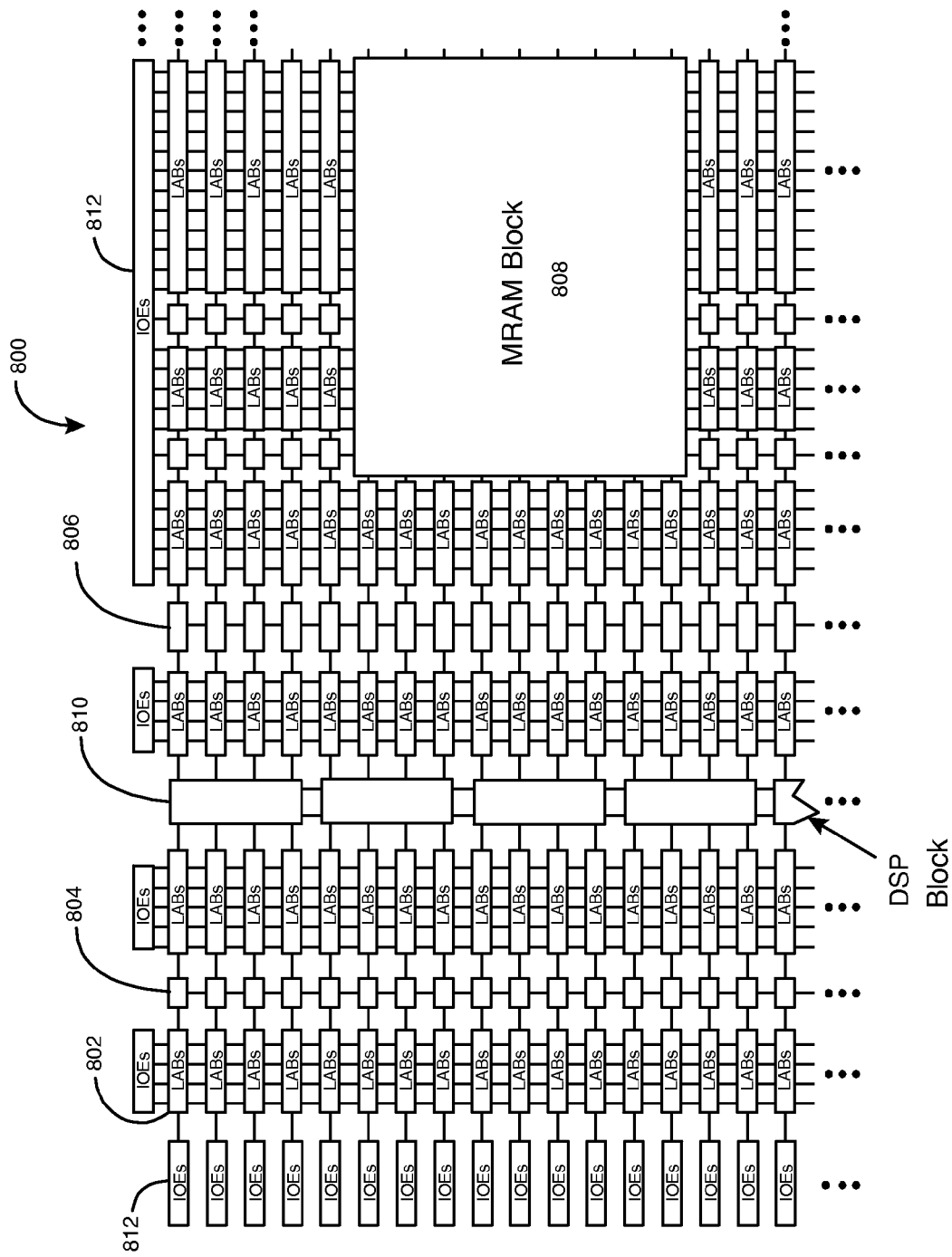
FIG. 8 is a simplified partial block diagram of a field programmable gate array (FPGA) that can include aspects of the present invention.

FIG. 8 is a simplified partial block diagram of a field programmable gate array (FPGA) 800 that can include aspects of the present invention. FPGA 800 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), and application specific integrated circuits (ASICs).

FPGA 800 includes a two-dimensional array of programmable logic array blocks (or LABs) 802 that are interconnected by a network of column and row interconnect conductors of varying length and speed. LABs 802 include multiple (e.g., 10) logic elements (or LEs).

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 800 also includes a distributed memory structure including random access memory (RAM) blocks of varying sizes provided throughout the array. The RAM blocks include, for example, blocks 804, blocks 806, and block 808. These memory blocks can also include shift registers and FIFO buffers.

FPGA 800 further includes digital signal processing (DSP) blocks 810 that can implement, for example, multipliers with add or subtract features. Input/output elements (IOEs) 812 located, in this example, around the periphery of the chip support numerous single-ended and differential input/output standards. IOEs 812 are coupled to input/output pins. Each of the input/output pins is coupled to an external terminal of the FPGA. It is to be understood that FPGA 800 is described herein for illustrative purposes only and that the present invention can be implemented in many different types of PLDs, FPGAs, and ASICs.

Figure 9:
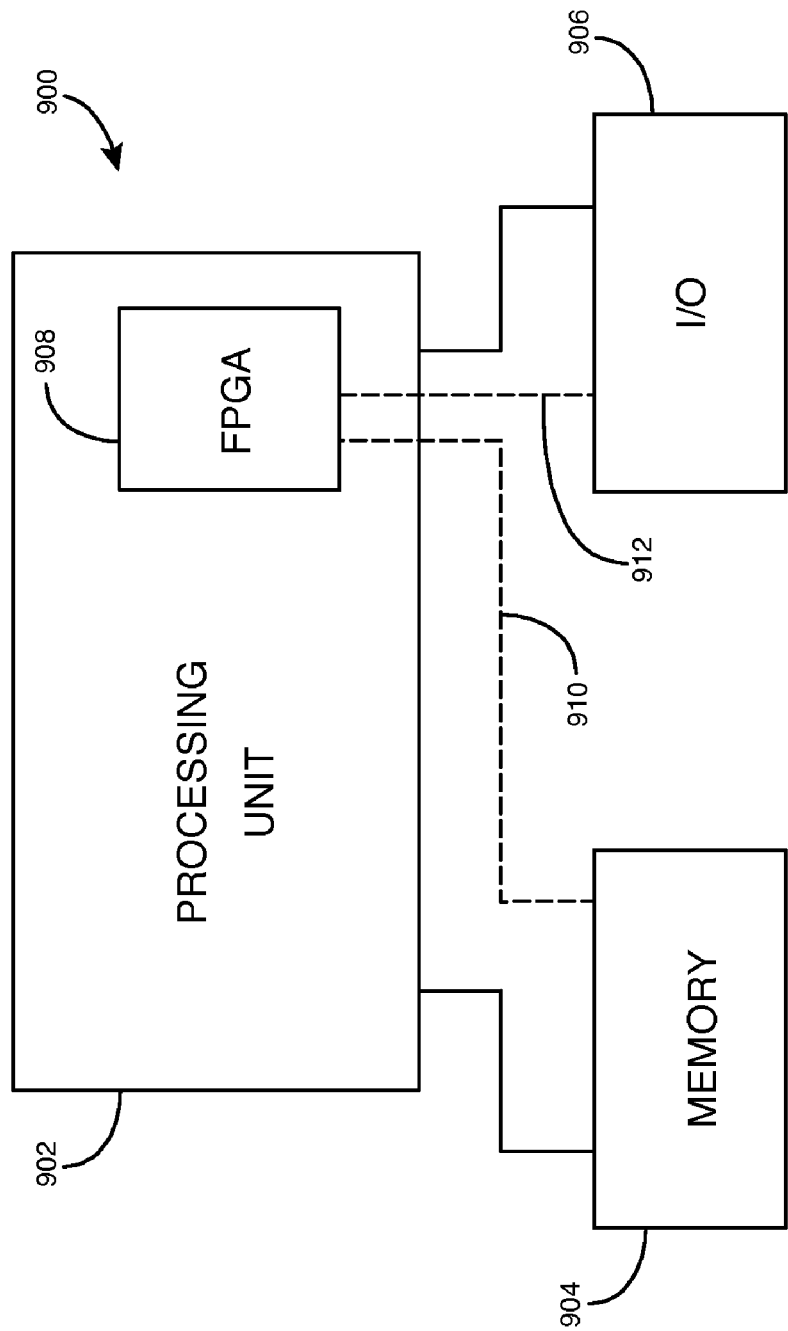
FIG. 9 shows a block diagram of an exemplary digital system 900 that can embody techniques of the present invention.

The present invention can also be implemented in a system that has an FPGA as one of several components. FIG. 9 shows a block diagram of an exemplary digital system 900 that can embody techniques of the present invention. System 900 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 900 can be provided on a single board, on multiple boards, or within multiple enclosures.

System 900 includes a processing unit 902, a memory unit 904, and an input/output (I/O) unit 906 interconnected together by one or more buses. According to this exemplary embodiment, an FPGA 908 is embedded in processing unit 902. FPGA 908 can serve many different purposes within the system of FIG. 9. FPGA 908 can, for example, be a logical building block of processing unit 902, supporting its internal and external operations. FPGA 908 is programmed to implement the logical functions necessary to carry on its particular role in system operation. FPGA 908 can be specially coupled to memory 904 through connection 910 and to I/O unit 906 through connection 912.

Processing unit 902 can direct data to an appropriate system component for processing or storage, execute a program stored in memory 904, receive and transmit data via I/O unit 906, or other similar functions. Processing unit 902 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 908 can control the logical operations of the system. As another example, FPGA 908 acts as a reconfigurable processor, which can be reprogrammed as needed to handle a particular computing task. Alternatively, FPGA 908 can itself include an embedded microprocessor. Memory unit 904 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention. In particular, the invention is herein described in the context of delay-looked loop circuits, but some or all of the inventive concepts are applicable to other types of circuits such as phase-locked loop circuits.

What is claimed is:

1. A circuit comprising:
a phase detector that compares a phase of a first clock signal to a phase of a second clock signal;
a first counter that generates first count signals based on an output of the phase detector;
a second counter that generates second count signals;
a first comparator that generates a first comparison signal based on the first count signals and the second count signals, wherein the second clock signal is based on the first comparison signal;
a first oscillator that generates a first oscillator signal, wherein the second counter generates the second count signals based on the first oscillator signal;
a third counter that generates third count signals; and
a second comparator that generates a second comparison signal based on the first count signals and the third count signals, wherein the first oscillator generates oscillations in the first oscillator signal based on the second comparison signal.

2. The circuit defined in claim 1 further comprising:
a second oscillator that generates a second oscillator signal, wherein the third counter generates the third count signals based on the second oscillator signal;
a fourth counter that generates fourth count signals; and
a third comparator that generates a third comparison signal based on the first count signals and the fourth count signals, wherein the second oscillator generates oscillations in the second oscillator signal based on the third comparison signal.

3. The circuit defined in claim 2 further comprising:
a flip-flop that stores a logic state of the first comparison signal as the second clock signal for transmission to the phase detector.

4. The circuit defined in claim 1 wherein the phase detector changes a logic state of one of first and second output signals when the phases of the first and the second clock signals are out of alignment, and the phase detector changes a logic state of a third output signal when the phases of the first and the second clock signals are aligned.

5. The circuit defined in claim 1 wherein the first counter is an up/down counter that is configured to increase and decrease a binary value of the first count signals in response to a first output signal of the phase detector.

6. The circuit defined in claim 1 wherein the circuit is fabricated on a programmable logic integrated circuit.

7. The circuit defined in claim 1 wherein the circuit comprises a delay-locked loop circuit.

8. A circuit comprising:
a phase detector that compares a phase of a first clock signal to a phase of a second clock signal;
a first counter that generates first count signals and that adjusts the first count signals when the phase detector indicates that the phases of the first and the second clock signals are out of alignment;
a second counter that generates second count signals;
a first comparator that generates a first comparison signal in response to a comparison between the first count signals and the second count signals, wherein the second clock signal is generated in response to the first comparison signal;
a first oscillator that generates a first oscillator signal, wherein the second counter adjusts the second count signals in response to the first oscillator signal;
a third counter that generates third count signals;
a second oscillator that generates a second oscillator signal, wherein the third counter adjusts the third count signals in response to the second oscillator signal; and
a second comparator that generates a second comparison signal in response to a comparison between at least a subset of the first count signals and the third count signals, wherein the first oscillator is enabled to generate oscillations in the first oscillator signal in response to the second comparison signal.

9. The circuit defined in claim 8 further comprising:
a fourth counter that generates fourth count signals;
a third oscillator that generates a third oscillator signal, wherein the fourth counter adjusts the fourth count signals in response to the third oscillator signal; and
a third comparator that generates a third comparison signal in response to a comparison between the first count signals and the fourth count signals, wherein the second oscillator is enabled to generate oscillations in the second oscillator signal in response to the third comparison signal.

10. A circuit comprising:
a phase detector that compares a phase of a first clock signal to a phase of a second clock signal;
a first counter that generates first count signals and that adjusts the first count signals when the phase detector indicates that the phases of the first and the second clock signals are out of alignment;
a second counter that generates second count signals;
a first comparator that generates a first comparison signal in response to a comparison between the first count signals and the second count signals, wherein the second clock signal is generated in response to the first comparison signal; and
a third counter that generates a third clock signal by dividing a frequency of the first clock signal, wherein the first counter adjusts the first count signals in response to the third clock signal when the phases of the first and the second clock signals are out of alignment.

11. A circuit comprising:
a phase detector that compares a phase of a first clock signal with a phase of a second clock signal;
a first counter that generates first count signals, wherein the first counter varies the first count signals to adjust the phase of the second clock signal and align the phases of the first and the second clock signals;
a first oscillator that generates a first oscillator signal having a frequency that is independent of variations in a phase offset between the first and the second clock signals;
a second counter that generates second count signals, wherein the second counter adjusts the second count signals in response to the first oscillator signal; and
a first comparator that generates a first comparison signal in response to a comparison between the first count signals and the second count signals, wherein the second clock signal is generated in response to the first comparison signal.

12. The circuit defined in claim 11 wherein the first counter increases a binary value of the first count signals to adjust the phase of the second clock signal in a first direction and decreases the binary value of the first count signals to adjust the phase of the second clock signal in a second direction.

13. The circuit defined in claim 11 wherein the circuit further comprises:
a third counter that generates third count signals;
a second oscillator that generates a second oscillator signal, wherein the third counter adjusts the third count signals in response to the second oscillator signal; and
a second comparator that generates a second comparison signal in response to a comparison between the first count signals and the third count signals, wherein the first oscillator is enabled to generate oscillations in the first oscillator signal in response to the second comparison signal.

14. The circuit defined in claim 13 wherein the first oscillator varies the frequency of the first oscillator signal in response to a first select signal, and the second oscillator varies a frequency of the second oscillator signal in response to a second select signal.

15. The circuit defined in claim 13 wherein the first oscillator varies a delay of the first oscillator signal in response to a first select signal, and the second oscillator varies a delay of the second oscillator signal in response to a second select signal.

16. The circuit defined in claim 11 wherein the first counter changes the first count signals in response to first and second output signals of the phase detector when the phases of the first and the second clock signals move out of alignment, and wherein the first counter maintains the first count signals constant in response to the first and the second output signals of the phase detector when the phases of the first and the second clock signals are aligned.

17. The circuit defined in claim 16 wherein the phase detector changes a logic state of one of the first and the second output signals when the phases of the first and the second clock signals move out of alignment, and the phase detector changes a logic state of a third output signal when the phases of the first and the second clock signals become aligned.

18. The circuit defined in claim 11 wherein the first counter increases a binary value of the first count signals to cause rising edges of the second clock signal to occur later in time, and decreases the binary value of the first count signals to cause rising edges of the second clock signal to occur sooner in time.

19. The circuit defined in claim 11 wherein the circuit further comprises:
a third counter that generates a third clock signal by dividing a frequency of the first clock signal, wherein the first counter adjusts the first count signals in response to the third clock signal when the phases of the first and the second clock signals are out of alignment.

20. The circuit defined in claim 11 wherein the circuit comprises a delay-locked loop circuit.

21. A method for generating an output clock signal, the method comprising:
comparing a phase of a first clock signal with a phase of a second clock signal;
generating first count signals;
varying the first count signals when the phases of the first and the second clock signals are out of alignment;
generating second count signals;
generating a first comparison signal in response a comparison between the first count signals and the second count signals;
generating the second clock signal in response to the first comparison signal;
generating a first oscillator signal;
varying the second count signals in response to the first oscillator signal;
generating third count signals;
generating a second comparison signal based on a comparison between at least a subset of the first count signals and the third count signals; and
enabling an oscillator to generate oscillations in the first oscillator signal based on the second comparison signal.

22. The method defined in claim 21 further comprising:
generating a second oscillator signal; and
varying the third count signals in response to the second oscillator signal.

23. The method defined in claim 21 wherein varying the first count signals when the phases of the first and the second clock signals are out of alignment further comprises increasing a binary value of the first count signals to adjust the phase of the second clock signal in a first direction and decreasing the binary value of the first count signals to adjust the phase of the second clock signal in a second direction to align the phases of the first and the second clock signals, wherein the first count signals are maintained at constant values when the phases of the first and the second clock signals are aligned.

24. A method comprising:
comparing a phase of a first clock signal with a phase of a second clock signal using a phase detector;
varying first count signals generated by a first counter based on an output of the phase detector;
generating a first oscillator signal;
generating second count signals based on the first oscillator signal using a second counter;
generating a first comparison signal based on the first count signals and the second count signals, wherein the second clock signal is generated in response to the first comparison signal;
generating third count signals using a third counter; and
generating a second comparison signal based on the first count signals and the third count signals, wherein generating a first oscillator signal comprises generating oscillations in the first oscillator signal based on the second comparison signal.

* * * * *